(12) United States Patent
Elwell et al.

(10) Patent No.: US 10,079,633 B2
(45) Date of Patent: Sep. 18, 2018

(54) TIME-BASED AND FREQUENCY-BASED RADIO BEAMFORMING WAVEFORM TRANSMISSION

(71) Applicant: The United States of America, as represented by the Secretary of the Army, Washington, DC (US)

(72) Inventors: Ryan Elwell, Newfield, NJ (US); Mark Govoni, Abingdon, MD (US)

(73) Assignee: The United States of America, as represented by the Secretary of the Army, Washington, DC (US)

( * ) Notice: Subject to any disclaimer, the term of this patent is extended or adjusted under 35 U.S.C. 154(b) by 302 days.

(21) Appl. No.: 14/868,509

(22) Filed: Sep. 29, 2015

(65) Prior Publication Data

US 2017/0093035 A1    Mar. 30, 2017

(51) Int. Cl.
*H04B 7/06* (2006.01)
*H04B 7/08* (2006.01)

(52) U.S. Cl.
CPC ........... *H04B 7/0671* (2013.01); *H04B 7/068* (2013.01); *H04B 7/0676* (2013.01); *H04B 7/08* (2013.01)

(58) Field of Classification Search
CPC ..... H04B 7/0671; H04B 7/0676; H04B 7/068
See application file for complete search history.

(56) References Cited

U.S. PATENT DOCUMENTS

| | | | |
|---|---|---|---|
| 4,656,642 A | 4/1987 | Apostolos et al. | |
| 5,909,460 A | 6/1999 | Dent | |
| 6,061,574 A | 5/2000 | Goldberg | |
| 6,219,375 B1 | 4/2001 | Dent | |
| 6,404,821 B1 | 6/2002 | Dent | |
| 7,430,257 B1 | 9/2008 | Shattil | |
| 7,593,449 B2 | 9/2009 | Shattil | |
| 7,684,529 B2 | 3/2010 | Chimitt et al. | |
| 7,737,892 B2 | 6/2010 | Richardson et al. | |
| 7,830,781 B2 | 11/2010 | Zogg et al. | |
| 7,965,761 B2 | 6/2011 | Shattil | |
| 7,979,024 B2 | 7/2011 | Zheng | |
| 8,179,843 B2 | 5/2012 | Ramanathan et al. | |
| 8,233,555 B2 * | 7/2012 | Naguib ................ | H04B 7/0417 375/267 |
| 8,427,372 B2 | 4/2013 | Sakai et al. | |
| 8,913,672 B2 | 12/2014 | Luo | |

(Continued)

FOREIGN PATENT DOCUMENTS

ES    2396341 A2    2/2013

OTHER PUBLICATIONS

English Translation of ES 2396341 A2 (Year: 2013).

(Continued)

*Primary Examiner* — Gregory C. Issing
(74) *Attorney, Agent, or Firm* — Ronald Krosky; Azza Jayaprakash

(57) ABSTRACT

Various embodiments are described that relate to radio beamforming waveform transmission. Transmission can occur, for example, in three manners. The first manner is time-based where waveform transmission is staggered at the same frequency. The second manner is frequency-based where different frequencies are used at one time. This third manner is a combination of time and frequency such that simultaneous transmission occurs, but at different times different frequencies are used.

20 Claims, 13 Drawing Sheets

(56) References Cited

U.S. PATENT DOCUMENTS

| | | | |
|---|---|---|---|
| 8,942,742 | B2 | 1/2015 | Wetmore |
| 9,014,732 | B2 | 4/2015 | Wetmore |
| 9,165,552 | B2 | 10/2015 | Oikawa et al. |
| 9,363,784 | B1 | 6/2016 | Friday et al. |
| 9,442,188 | B2 | 9/2016 | Rector et al. |
| 9,541,638 | B2 * | 1/2017 | Jansen .................. G01S 13/343 |
| 9,735,920 | B2 | 8/2017 | Luo |
| 2006/0152403 | A1 | 7/2006 | Wicks et al. |
| 2006/0220956 | A1 | 10/2006 | Richardson et al. |
| 2006/0244653 | A1 | 11/2006 | Szajnowski |
| 2006/0269023 | A1 | 11/2006 | Chimitt et al. |
| 2007/0008213 | A1 | 1/2007 | Adams et al. |
| 2008/0131133 | A1 | 6/2008 | Blunt et al. |
| 2010/0046421 | A1 | 2/2010 | Adams |
| 2011/0064160 | A1 | 3/2011 | Haustein et al. |
| 2011/0084880 | A1 | 4/2011 | Sakai et al. |
| 2012/0122500 | A1 | 5/2012 | Wetmore |
| 2012/0146844 | A1 * | 6/2012 | Stirling-Gallacher ....................... G01S 13/34 342/189 |
| 2012/0154203 | A1 | 6/2012 | Vacanti et al. |
| 2012/0218139 | A1 | 8/2012 | Suzuki et al. |

OTHER PUBLICATIONS

Dictionary definition for frequency band, Hargrave's Communications Dictionary, Wiley. Hoboken, NJ: Wiley. Retrieved from https://search.credoreference.com/content/entry/hargravecomms/frequency_band/0 (Year: 2001).

* cited by examiner

TIME-BASED AND FREQUENCY-BASED RADIO BEAMFORMING WAVEFORM TRANSMISSION

GOVERNMENT INTEREST

The innovation described herein may be manufactured, used, imported, sold, and licensed by or for the Government of the United States of America without the payment of any royalty thereon or therefor.

CROSS-REFERENCE

This application is related to a patent application with application Ser. No. 14/868,493, filed on Sep. 29, 2015. This application is also related to a patent application with application Ser. No. 14/868,506, filed on Sep. 29, 2015.

BACKGROUND

In communications, a signal can be transferred from one location to another. This signal can communicate information. In an environment that is complex, this information can be vital for mission success. As the environment becomes more complex, a desire can arise for multiple signals to be transmitted concurrently so more information can be quickly communicated.

SUMMARY

In one embodiment, a system comprises a first transmitter configured to transmit a first radio beamforming waveform and a second transmitter configured to transmit a second radio beamforming waveform. The first transmitter is configured to transmit the first radio beamforming waveform and the second transmitter is configured to transmit the second radio beamforming waveform, at least in part, concurrently. The first transmitter is configured to transmit the first radio beamforming waveform in a frequency band and the second transmitter is configured to transmit the second radio beamforming waveform in the frequency band. The first transmitter and the second transmitter can be non-synchronous with regard to time and frequency.

In one embodiment, a system comprises a plurality of receivers with the plurality of receivers comprising a first receiver configured to receive a response to a first radio beamforming waveform and a second receiver configured to receive a response to the second radio beamforming waveform. The first transmitter of a plurality of transmitters can be configured to transmit a first radio beamforming waveform and a second transmitter of the plurality of transmitters can be configured to transmit a second radio beamforming waveform. The first transmitter can be configured to transmit the first radio beamforming waveform and the second transmitter can be configured to transmit the second radio beamforming waveform, at least in part, simultaneously. The first transmitter can be configured to transmit the first radio beamforming waveform in a frequency band and the second transmitter can be configured to transmit the second radio beamforming waveform in the frequency band. The first transmitter and the second transmitter can be non-synchronous to one another with regard to time and frequency.

In one embodiment, a method comprises transmitting, by way of a first transmitter that is part of a plurality of transmitters, a first radio beamforming waveform and transmitting, by way of a second transmitter that is part of the plurality of transmitters, a second radio beamforming waveform. The method also comprises receiving, by way of a first receiver that is part of a plurality of receivers, a response to the first radio beamforming waveform, which is transmitted by way of the first transmitter and receiving, by way of a second receiver that is part of the plurality of receivers, a response to the second radio beamforming waveform, which is transmitted by way of the second transmitter. The method additionally comprises processing the response to the first radio beamforming waveform by way of channelization of the first radio beamforming waveform through partitioning of the first radio beamforming waveform into a number of channels that is at least equal to a number of transmitters in the plurality of transmitters and processing the response to the second radio beamforming waveform by way of channelization of the second radio beamforming waveform through partitioning of the second radio beamforming waveform into a number of channels that is at least equal to a number of transmitters in the plurality of transmitters

BRIEF DESCRIPTION OF THE DRAWINGS

Incorporated herein are drawings that constitute a part of the specification and illustrate embodiments of the detailed description. The detailed description will now be described further with reference to the accompanying drawings as follows.

DETAILED DESCRIPTION

Figure 1:
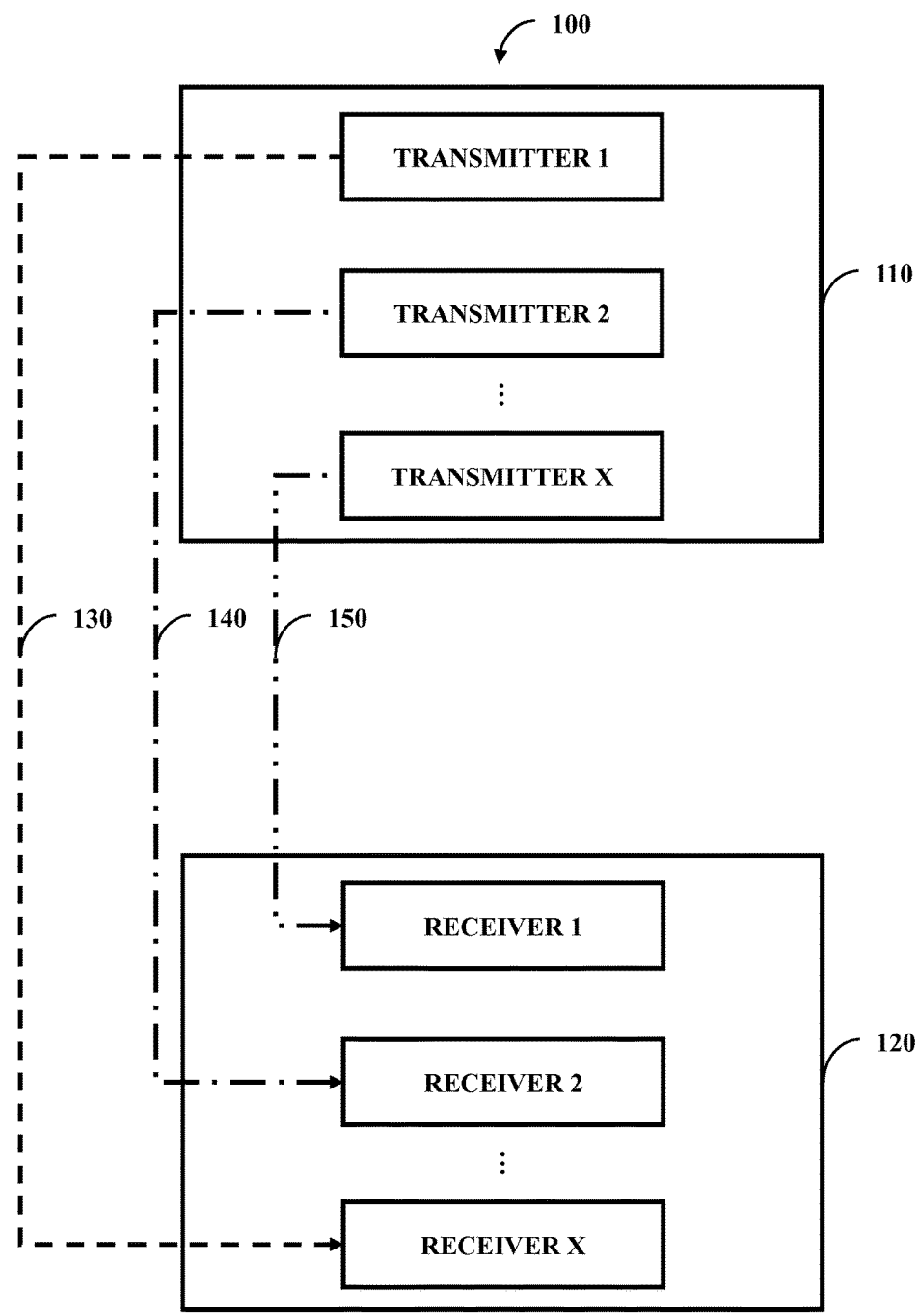
FIG. 1 illustrates one embodiment of a system comprising a plurality of transmitters and a plurality of receivers.

In one embodiment, multiple radio beamforming waveforms can be communicated in a multiple input-multiple output (MIMO) environment. These multiple waveforms can be redundant copies of the same waveforms or be different waveforms. If the multiple waveforms are transmitted concurrently without a shift, then the waveforms may not be clearly communicated. Therefore, multiple waveforms can be transmitted concurrently and these waveforms can be shifted from one another such that clear communication occurs.

Various types of shifts can occur. In one embodiment, shifting can be time based. With time based shifting, signal transmission can be staggered such that the signal does not conflict with itself. In one embodiment, shifting can be frequency based. Different signals with different frequencies can be transmitted simultaneously, and due to these different frequencies, signal confusion can be unlikely to occur. In one embodiment, shifting can be circular based. With circular based shifting, different signals can be moved with relation to time and frequency.

The following includes definitions of selected terms employed herein. The definitions include various examples. The examples are not intended to be limiting.

"One embodiment", "an embodiment", "one example", "an example", and so on, indicate that the embodiment(s) or example(s) can include a particular feature, structure, characteristic, property, or element, but that not every embodiment or example necessarily includes that particular feature, structure, characteristic, property or element. Furthermore, repeated use of the phrase "in one embodiment" may or may not refer to the same embodiment.

"Computer-readable medium", as used herein, refers to a medium that stores signals, instructions and/or data. Examples of a computer-readable medium include, but are not limited to, non-volatile media and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, other optical medium, a Random Access Memory (RAM), a Read-Only Memory (ROM), a memory chip or card, a memory stick, and other media from which a computer, a processor or other electronic device can read. In one embodiment, the computer-readable medium is a non-transitory computer-readable medium.

"Component", as used herein, includes but is not limited to hardware, firmware, software stored on a computer-readable medium or in execution on a machine, and/or combinations of each to perform a function(s) or an action (s), and/or to cause a function or action from another component, method, and/or system. Component may include a software controlled microprocessor, a discrete component, an analog circuit, a digital circuit, a programmed logic device, a memory device containing instructions, and so on. Where multiple components are described, it may be possible to incorporate the multiple components into one physical component or conversely, where a single component is described, it may be possible to distribute that single component between multiple components.

"Software", as used herein, includes but is not limited to, one or more executable instructions stored on a computer-readable medium that cause a computer, processor, or other electronic device to perform functions, actions and/or behave in a desired manner. The instructions may be embodied in various forms including routines, algorithms, modules, methods, threads, and/or programs including separate applications or code from dynamically linked libraries.

FIG. 1 illustrates one embodiment of a system 100 comprising a plurality of transmitters 110 and a plurality of receivers 120. The plurality of transmitters 110 comprises two or more transmitters with FIG. 1 illustrating Transmitter 1 that can be considered a first transmitter, Transmitter 2 that can be considered a second transmitter, and Transmitter X with X being a positive integer valued at two or greater. Similar to the plurality of transmitters 110, the plurality of receivers 120 comprises two or more receivers with FIG. 1 illustrating Receiver 1 that can be considered a first receiver, Receiver 2 that can be considered a second receiver, and Receiver X with X being a positive integer.

While the plurality of receivers 120 and the pluralities of transmitters 110 are shown as separate elements, it is to be appreciated that these could be configured as one element. In one example, Transmitter 1 and Receiver 1 can function as one piece of hardware and therefore be co-located. This can be used when Transmitter 2 and Receiver 2 are either one piece of hardware or are separate. For both the plurality of transmitters 110 and the plurality of receivers 120, while it visually appears that there are at least three transmitters and three receivers, the plurality can be implemented with two transmitters and/or two receivers.

The plurality of transmitters 110 can transmit a plurality of waveforms 130, 140, and 150 (waveforms 130-150 can be the same waveforms or different waveforms). After transmission, the plurality of receivers 120 can receive the waveforms 130-150 and/or a response to the waveforms 130-150 (e.g., a reflection of the waveforms 130-150 off a surface). The waveforms 130-150 can be shifted from one another such that clear communication can occur between the plurality of transmitters 110 and the plurality of receivers 120.

In one embodiment, transmitter 1 can be configured to transmit a first radio beamforming waveform (e.g., waveform 130) at a first time ($\tau_1$). Transmitter 2 can be configured to transmit a second radio beamforming waveform (e.g., waveform 140) at a second time ($\tau_2$). The second time has a delay from the first time such that Transmitter 1 is configured to transmit the second radio beamforming waveform after Transmitter 2 transmits the first radio beamforming waveform. The first radio beamforming waveform and the second radio beamforming waveform can be part of a radio beamforming waveform set (e.g., be either the entire waveform set or members with other waveforms in the waveform set).

In one embodiment, transmitter 1 can be configured to transmit the first radio beamforming waveform at a first frequency. Transmitter 2 can be configured to transmit a second radio beamforming waveform at a second frequency (e.g., transmitted, at least in part, concurrently with transmission of the first waveform). The first frequency and the second frequency can be different frequencies and/or be in different frequency bands that are separate and distinct (no overlap of the bands or adjacent overlap such that the end frequency of one band is the start frequency of the next band).

The plurality of receivers 120 can be configured to receive a response to the first radio beamforming waveform and the second radio beamforming waveform. The response, for example, can be the waveform itself, a distorted version of the waveform (e.g., due to interference), or a reflection of the waveform off the surface. The multiple receivers of the plurality of receivers can receive a response from the same waveform.

The plurality of receivers 120 can be configured to receive a response to transmission of the first radio beamforming waveform (e.g., at Receiver 1) and configured to receive a response to transmission of the second radio waveform (e.g., at Receiver 2). The first radio beamforming waveform and the second radio beamforming waveform can be either the same waveform or different waveforms, and/or can be part of the radio beamforming waveform set. When the first and second radio beamforming waveforms are the same signal, they can be transmitted at the same frequency.

In one embodiment, the first transmitter can be configured to transmit the first radio beamforming waveform and the second transmitter can be configured to transmit the second radio beamforming waveform. The first transmitter and the second transmitter can be such that they are non-synchronous to one another with regard to time and frequency. This can be that their respective transmission (e.g., the first and second waveforms respectively) can be non-synchronous to one another with regard to time and frequency. These transmissions can function concurrently (e.g., simultaneously) and/or be in the same frequency band.

Figure 2:
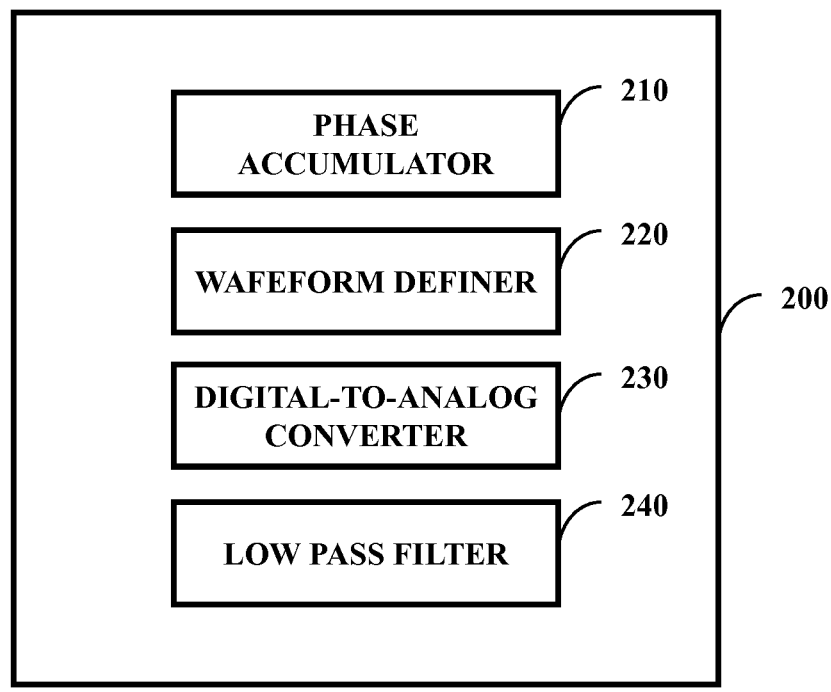
FIG. 2 illustrates one embodiment of a system comprising a phase accumulator, a waveform definer, a digital-to-analog converter, and a low pass filter.

FIG. 2 illustrates one embodiment of a system 200 comprising a phase accumulator 210, a waveform definer 220, a digital-to-analog converter 230, and a low pass filter 240. The system 200 can function as an arbitrary waveform generator and be used in conjunction with the system 100 of FIG. 1 to produce the waveforms 130-150 of FIG. 1. The phase accumulator 210 can produce clocked information and this information can be used by the waveform definer 220. The waveform definer 220 can produce the basis of the waveforms 130-150. This can be done through access of an internal memory bank that retains pre-stored definitions and/or received from an external source, such as a software-controller interface delivering custom-designed definitions. The digital to analog converter 230 can change the output of the waveform definer 220 to analog and this analog waveform can be filtered by the low pass filter 240 and outputted (e.g., transmitted).

Figure 3:
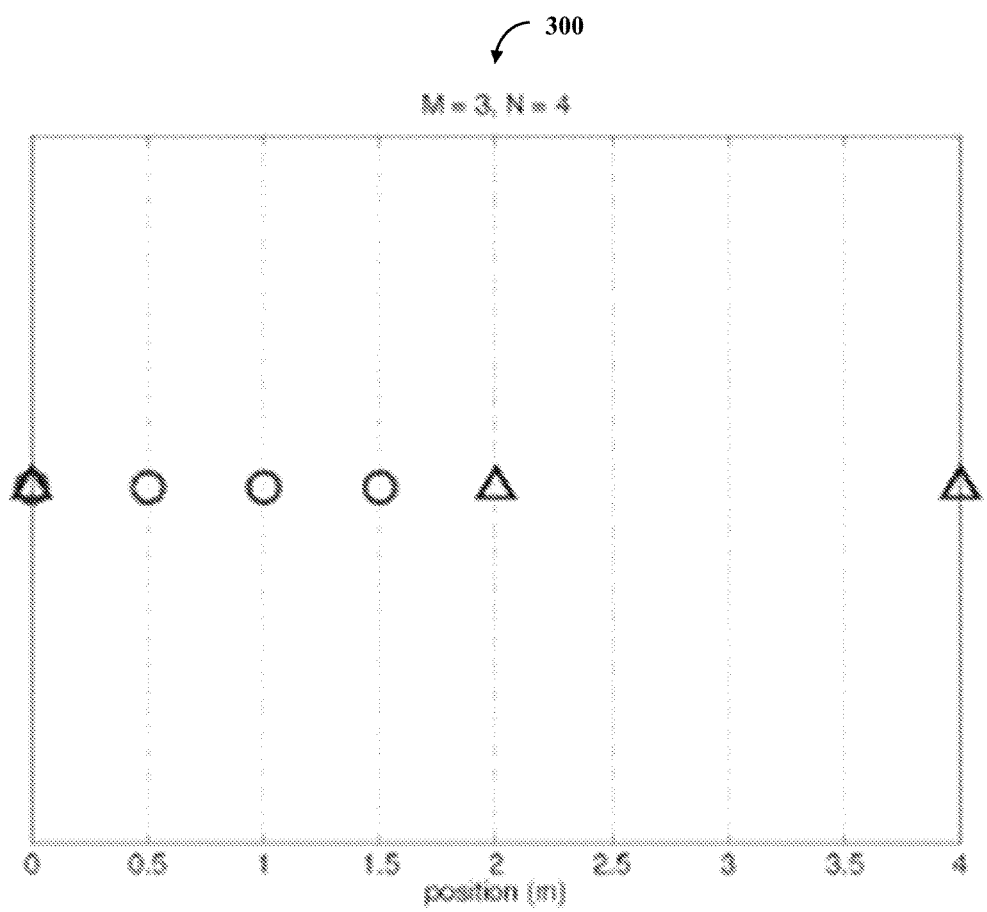
FIG. 3 illustrates one embodiment of a layout of a multiple input-multiple output system.

FIG. 3 illustrates one embodiment of a layout 300 of a MIMO system. The layout 300 is for a wavelength of 1 meter and illustrates a physical configuration for the plurality of transmitters 110 of FIG. 1 and the plurality of receivers 120 of FIG. 1. Individual transmitters are triangles while individual receivers are circles. At position 0, both a transmitter and receiver are illustrated. This can be that the transmitter and receiver are co-located (e.g., next to one another) or that one device functions as a transmitter and a receiver, and thus is part of both pluralities 110 and 120.

The MIMO system can comprise the plurality of transmitters 110 of FIG. 1 and the plurality of receivers 120 of FIG. 1. The MIMO system (otherwise known as MIMO array) can transmit waveforms across a real array such that low correlation exists between transmitted signals (e.g., waveforms 130-150 of FIG. 1) in the waveform vector $s(t) = [s_0(t), \ldots, s_{M-1}(t)]$. Conditions for orthogonality can satisfy the following: $\int_\tau s(t)s^H(t)dt = I_M$, where $\tau$ is the pulse duration, t is the time index, $I_M$ is the M×M identity matrix, and $(\cdot)^H$ is the Hermitian transpose. Thus, convolution of the M sub-arrays can yield an increase in available degrees of freedom, as well as an increase in spatial resolution. Orthogonality can be ensured in various manners, such as in time, in frequency, or in some combination thereof.

Figure 4:
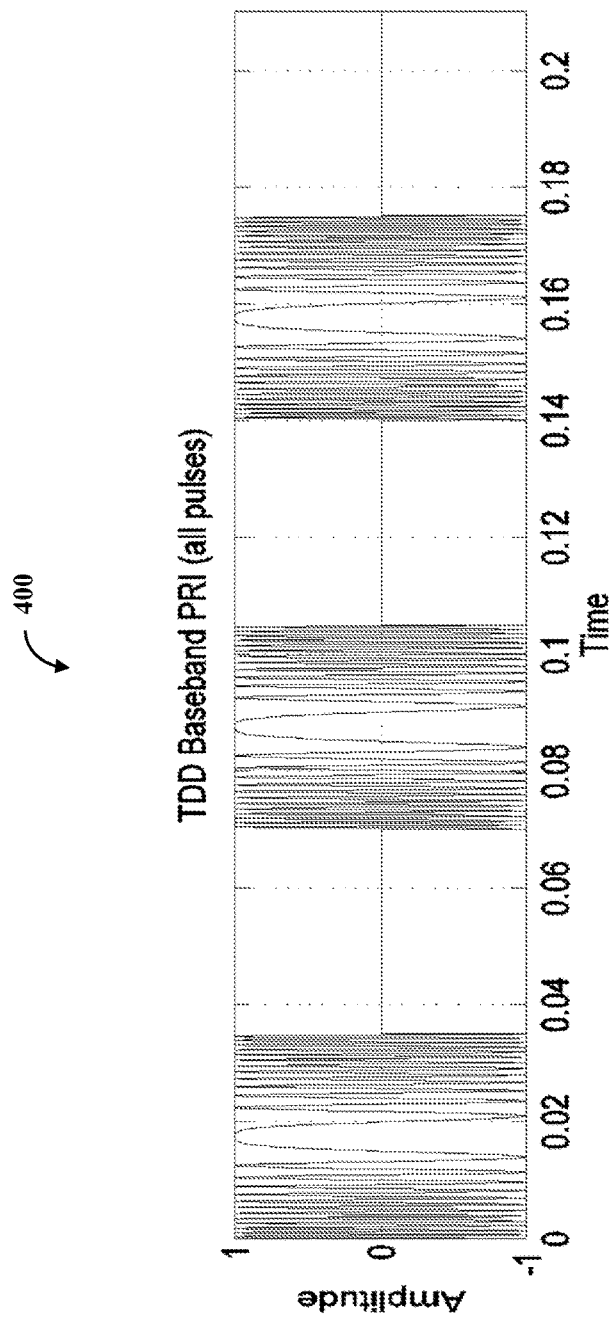
FIG. 4 illustrates one embodiment of a graph.

FIG. 4 illustrates one embodiment of a graph 400. The graph 400 illustrates how to implement time-division duplex pulse-compressed MIMO radar waveforms. The graph 400 shows that orthogonality can be achieved through time. With this, the same waveform can be sent out three times (e.g., waveforms 130-150 are the same waveform). Transmission of the waveforms can be staggered such that a second waveform is not transmitted until after transmission of a first waveform is complete.

Ensuring orthogonality in the time domain can mean that only one transmitter in the MIMO array can be active at a time (active in transmission). That is, the transmitter firing sequence for a MIMO waveform construct can have intermittent delays across transmitters equal to at least one pulse repetition interval (PRI). The time-division duplex MIMO transmit waveform can be designed as:

$$s_m(t) = \Sigma_{l=0}^{L-1} u[t-(Ml+m)T_0]\exp\{j\pi\mu t^2\}, m = 0 \ldots M-1 \quad (1)$$

where M is the number of transmitters that are part of the plurality of transmitters 110 of FIG. 1, L is the number of pulses, $T_0$ is the PRI, and $\mu$ is the linear frequency modulated (LFM) chirp rate. In view of this, the members of the radio beamforming waveform set can be dependent on the PRI, the chirp rate (LFM chirp rate), pulse number, number of transmitters, or a combination thereof. By inspection of (1), the plurality of transmitters 110 of FIG. 1 can transmit a pulse every $MT_0$ seconds. During a signal processing stage, channelization of the M×N MIMO array (N being number of receivers in the plurality of receivers 120 of FIG. 1) can be streamlined to the equivalent of a uniform linear array (ULA) that can be in one example 1×MN since a matched filter (e.g., used in digital signal processing) can be identical for transmitted signals.

Figure 5:
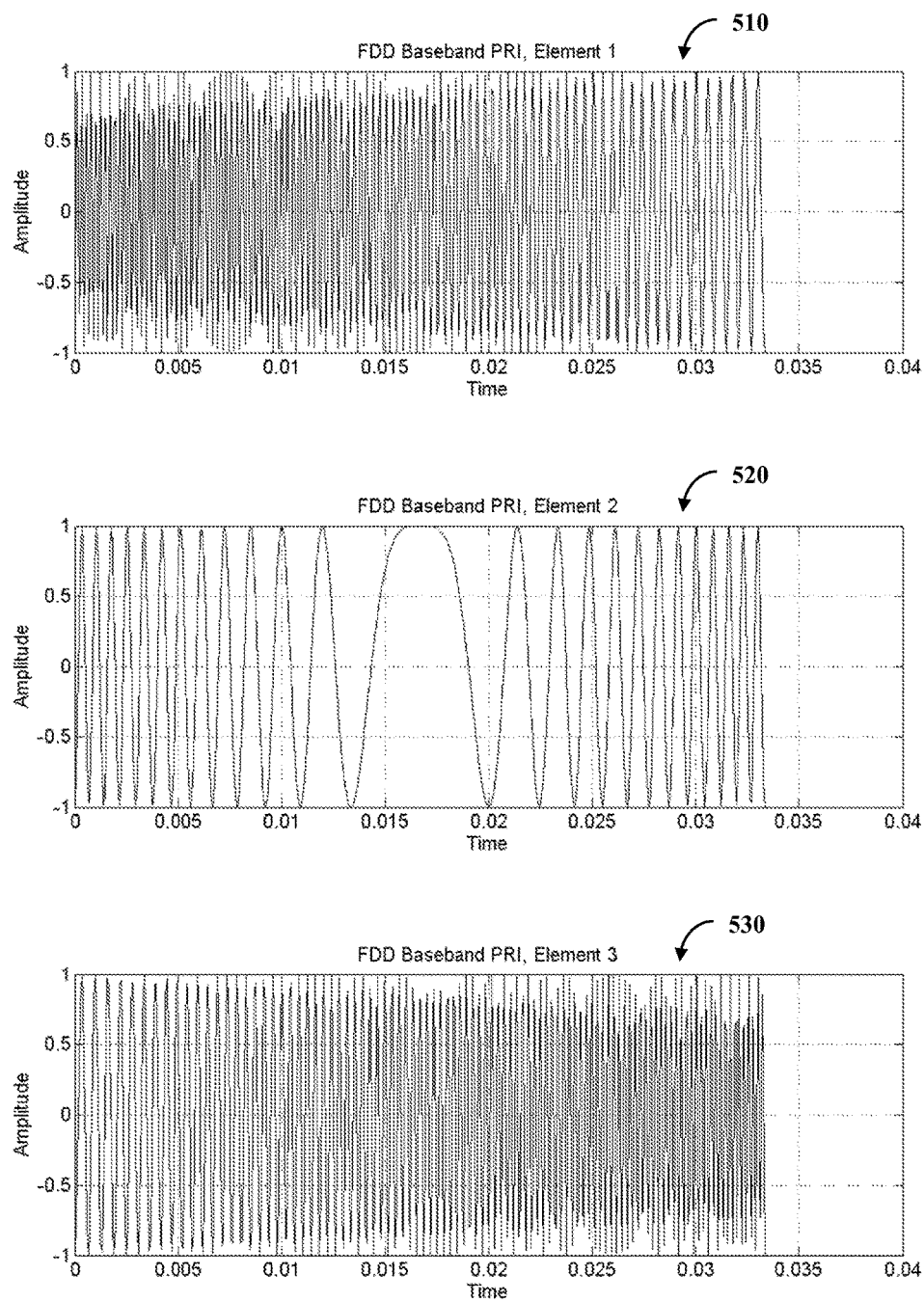
FIG. 5 illustrates one embodiment of three graphs.
Figure 6A:
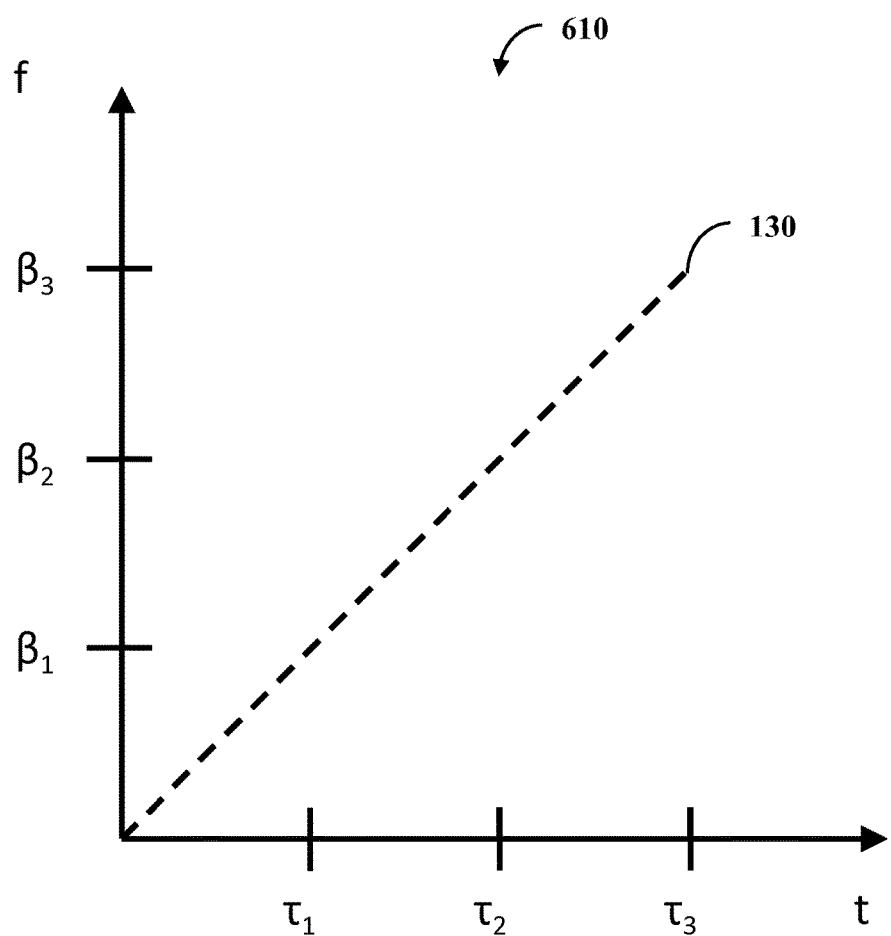
FIGS. 6a-6d illustrate the time vs. frequency of three waveforms—one graph for each waveform individually and one graph showing all three waveforms.
Figure 6B:
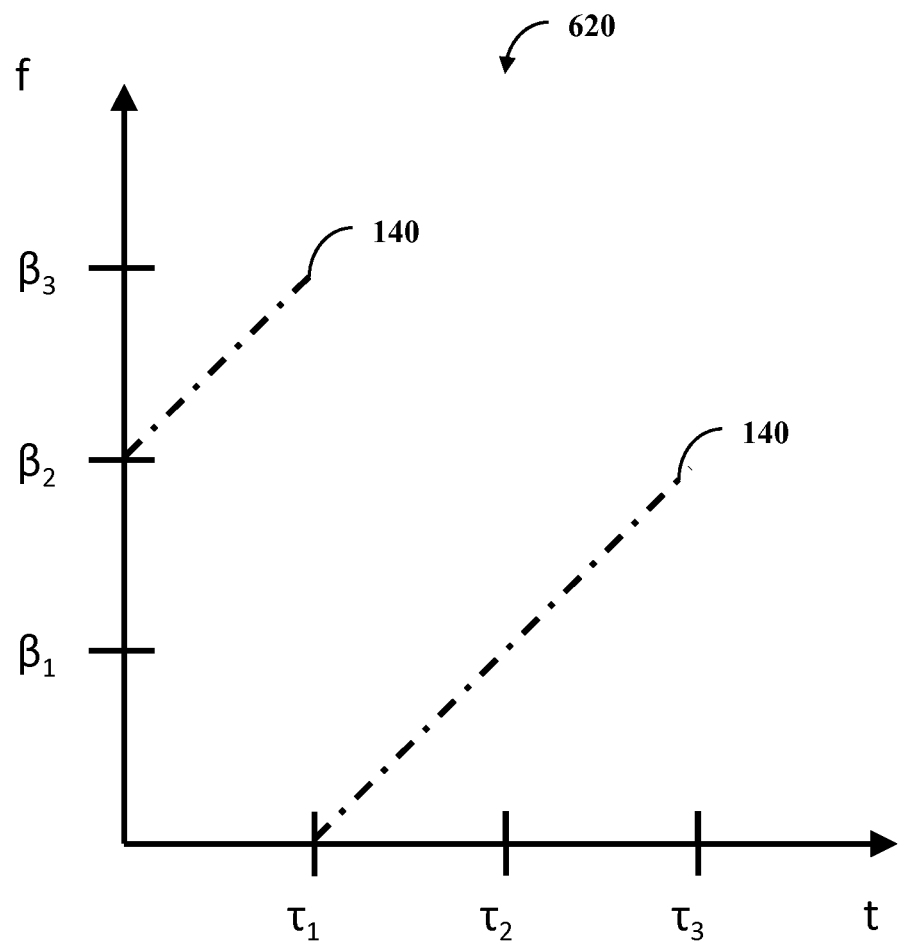
Figure 6C:
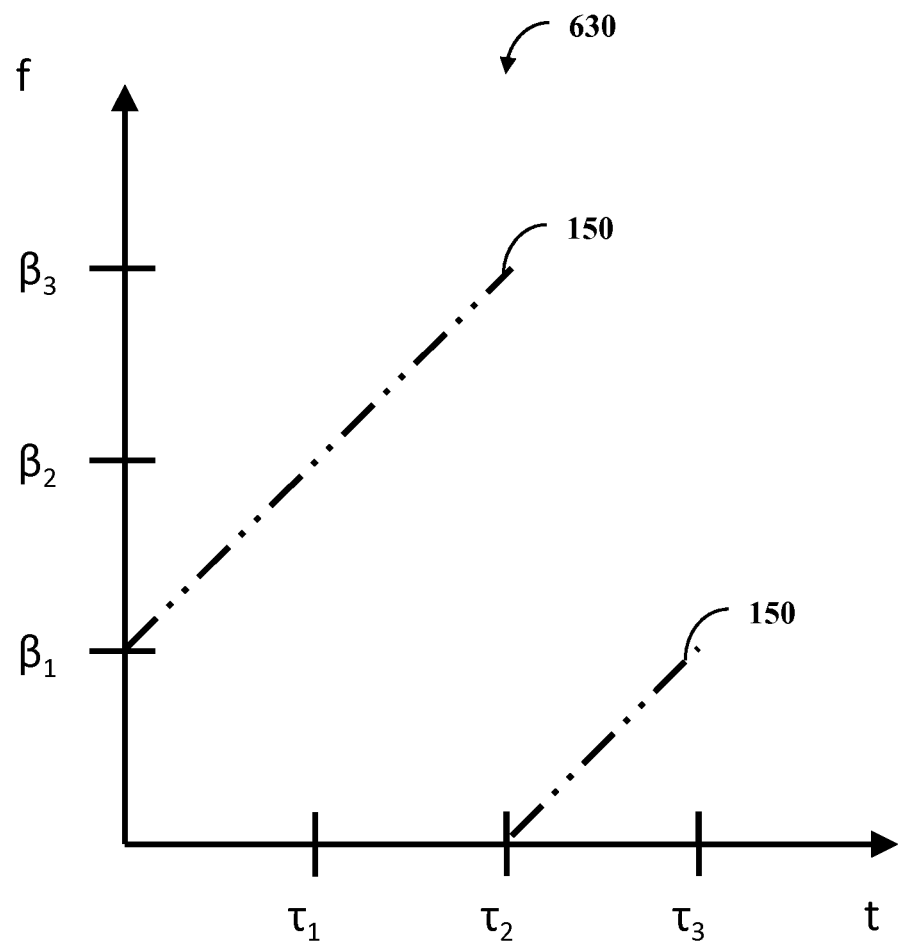
Figure 6D:
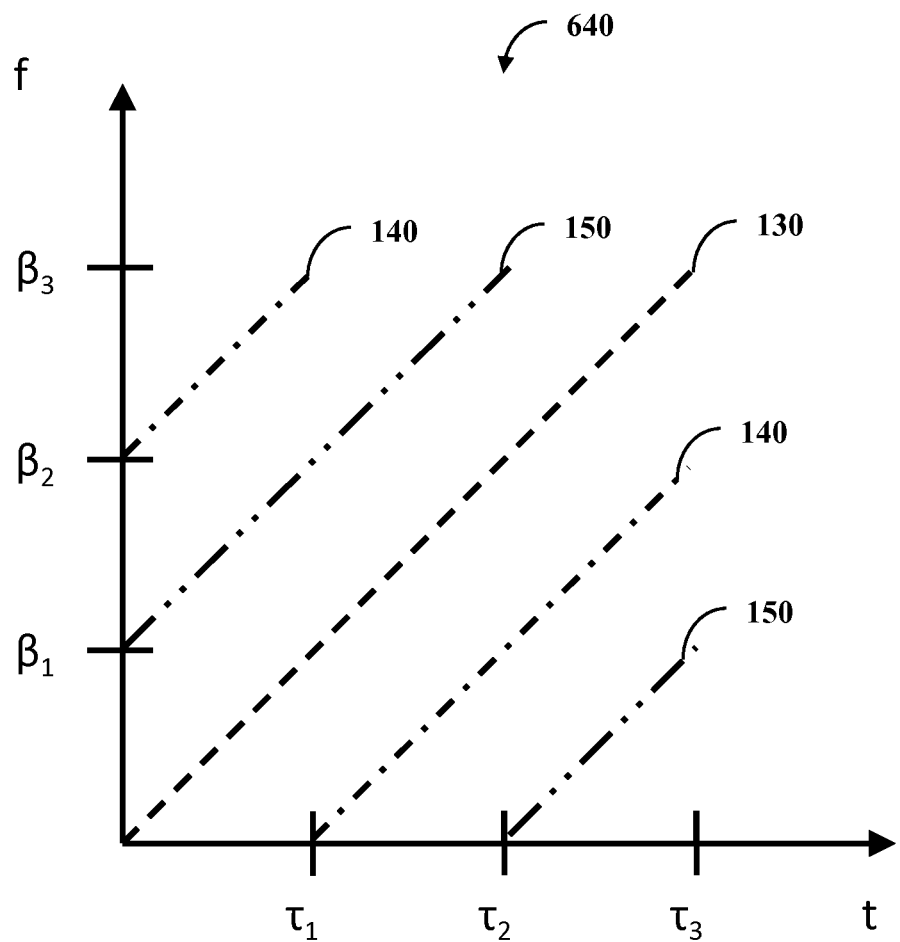

FIG. 5 illustrates one embodiment of three graphs 510-530. The three graphs 510-530 illustrate how to implement frequency-division duplex pulse-compressed MIMO radar waveforms. Orthogonalitiy in the frequency domain can function to not constrain an active state of the MIMO array, and therefore, the individual transmitters can operate simultaneously; however, orthogonality, along with unambiguity, in the frequency-domain can be ensured if the waveforms 130-150 of FIG. 1 are separated by a frequency deviation equal to at least the swept bandwidth, $\beta$. As a result, a total frequency deviation can depend on the number of transmitters in the MIMO array. These transmitters can span an operational bandwidth of $M\beta$. The frequency-division duplex MIMO transmit waveform can be designed as $$s_m(t) = \Sigma_{l=0}^{L-1} u[t-lT_0]\exp\{j\pi(2m\Delta f(1-\varepsilon)t+\mu t^2)\},\\ m = 0 \ldots M-1 \quad (2)$$

where M is the number of individual transmitters, L is the number of pulses, $T_0$ is the PRI, $\Delta f$ is the frequency shift, $\varepsilon$ is the frequency offset used to control the amount of spectrum overlap in the transmitted signals (e.g., $\varepsilon = 0.5$ is 50% overlap), and $\mu$ is the LFM chirp rate. In view of this, the radio beamforming waveform set can be dependent on PM, frequency shift, frequency offset, number of pulses, the number of transmitters in the plurality of transmitters 110 of FIG. 1, or a combination thereof.

The individual transmitters, in one example designated as element 1, element 2, and element 3, can transmit the waveforms 130-150 of FIG. 1 at different frequencies. By inspection of equation (2), the individual transmitters transmit pulses simultaneously, however, each pulse is swept over a frequency deviation of $[m \Delta f(1-\varepsilon)+\mu t]$ Hz. During a signal processing stage, the channelization of the M×N MIMO array can be partitioned into M channels each having a matched filter that corresponds to the $m^{th}$ transmit signal.

FIGS. 6a-6d illustrate the time vs. frequency of the three waveforms 130-150—one graph for each waveform individually (graphs 610-630) and one graph 640 showing all three waveforms. As graph 640 illustrates, the waveforms can be communicated simultaneously, occupying different bandwidths (or within distinct bandwidth ranges) at the same time. At time (t) of $\tau_1$, the first waveform 130 is at a frequency (f) of $\beta_1$, the second waveform 140 is at a frequency (f) of $\beta_3$ and the third waveform 150 is at a frequency (f) of $\beta_2$. Therefore, at the same time the waveforms 130-150 can be at different frequencies. At time of $\tau_2$ the first waveform 130 is at a frequency (f) of $\beta_2$ while the second waveform 140 is at a frequency (f) of $\beta_1$ and the third waveform 150 is at a frequency (f) of $\beta_3$. Therefore, the waveforms 130-150 can occupy the same frequency, but at different times.

By encoding a waveform (e.g., radar waveform) using a combination of time-division duplex pulse-compressed and frequency-division duplex pulse-compressed techniques (the combination can be considered a circular-shifted duplex pulse-compressed technique), orthogonality can be achieved in an efficient manner. That is, the MIMO system (e.g., MIMO radar system) can function without staggering a transmitter firing sequence, as is done with time-division duplex pulse compression, and the MIMO system can function without the need to span a large operational bandwidth as is done with frequency-division duplex pulse compression. By circular-shifting, the individual transmitters of the plurality of transmitters 110 of FIG. 1 are able to fire simultaneously while operating over one instantiation of swept bandwidth, β. The circular-shifted duplex MIMO transmit waveform can be designed as:

$$s_m(t) = \Sigma_{l=0}^{L-1} a[t-lT_0], m=0 \ldots M-1 \quad (3)$$

where $$a(t) = \Sigma_{m=0}^{M-1} \Sigma_{z=0}^{Z-1} u[t-zT_b] \exp\{j\pi(2\delta_{m,z}t+\mu t^2)\} \quad (4)$$

and where M is the number of transmit elements, L is the number of pulses, Z is the number of sub-pulses, $T_0$ is the PRI, $T_b = \tau/Z$ is the sub-pulse defined as a function of the total pulse duration τ, $\delta_{m,z} = \Delta f \{(z-m)_{mod\ Z}\}$ is the sub-carrier frequency step (mod Z) defined as a function of $\Delta f = \beta/Z$, and μ is the LFM chirp rate. Therefore, the radio beamforming waveform set can be dependent on the number of sub-pulses, the sub-pulse duration, and the number of sub-carriers, the sub-carrier frequency step, PRI, the number of pulses, the chirp rate, or a combination thereof. During signal processing stages, channelization of the M×N circular-shifted MIMO can be partitioned into M channels, which each have a matched filter that corresponds to the transmit signals.

Figure 7:
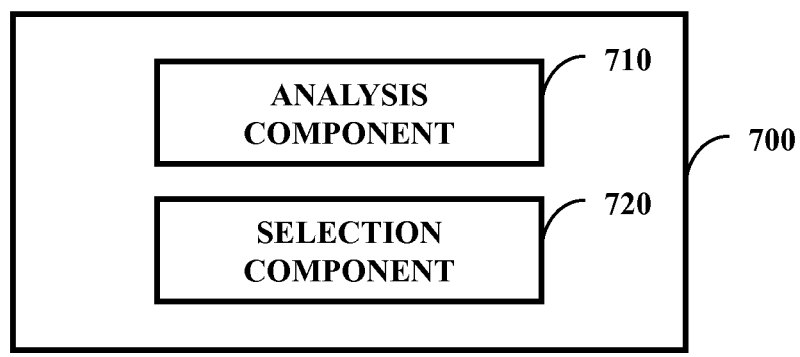
FIG. 7 illustrates one embodiment of a system comprising an analysis component and a selection component.

FIG. 7 illustrates one embodiment of a system 700 comprising an analysis component 710 and a selection component 720. The analysis component 710 can perform an analysis on a situation to produce an analysis result. Based, at least in part, on the analysis result, the selection component 720 can select a pulse compression technique to use.

In one example, the analysis component 710 can analyze waveforms for transmission. The result from this analysis can be that the waveforms are identical. The selection component 720 can determine that time-division duplex pulse compression is appropriate.

In another example, the analysis component 710 can analyze waveforms for transmission. The result from this analysis can be that the waveforms are not identical. The selection component 720 can determine that either the circular-shifted duplex pulse compressed technique or the frequency-shifted duplex pulse compressed technique is appropriate. The selection component 720 can select one of these two techniques, such as through determining an available frequency band and subsequently basing this decision depending on the available frequency band.

Figure 8:
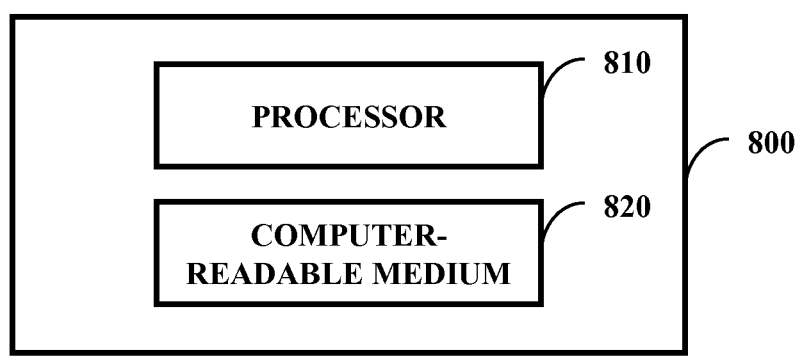
FIG. 8 illustrates one embodiment of a system comprising a processor and a computer-readable medium.

FIG. 8 illustrates one embodiment of a system 800 comprising a processor 810 (e.g., a general purpose processor or a processor specifically designed for performing functionality disclosed herein) and a computer-readable medium 820 (e.g., non-transitory computer-readable medium). In one embodiment, the processor 810 is a pulse compression processor configured to process the first and second radio beamforming waveforms through pulse compression. In one embodiment, the computer-readable medium 820 is communicatively coupled to the processor 810 and stores a command set executable by the processor 810 to facilitate operation of at least one component disclosed herein (e.g., the analysis component 710 of FIG. 7 or a selection component configured to select the delay). In one embodiment, at least one component disclosed herein (e.g., the selection component 720 of FIG. 7) can be implemented, at least in part, by way of non-software, such as implemented as hardware by way of the system 800. In one embodiment, the computer-readable medium 820 is configured to store processor-executable instructions that, when executed by the processor 810, cause the processor 810 to perform a method disclosed herein (e.g., the methods 900-1000 addressed below).

Figure 9:
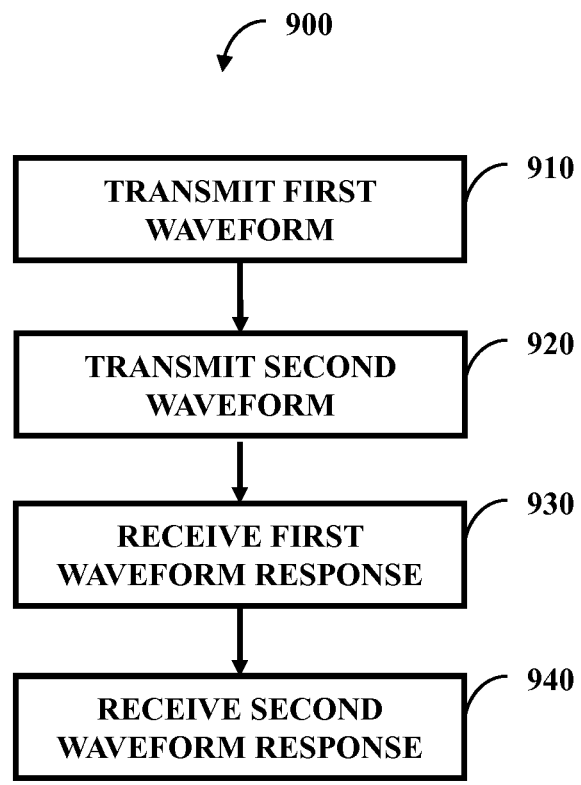
FIG. 9 illustrates one embodiment of a method comprising four actions.

FIG. 9 illustrates one embodiment of a method 900 comprising four actions 910-940. At 910, transmitting a first radio beamforming waveform at a first time can occur. This can be done by way of the first transmitter, which is part of the plurality of transmitters 110 of FIG. 1. At 920, transmitting a second radio beamforming waveform can occur. This transmission can occur either at the first time or at a second time after transmission of the first radio beamforming waveform at the first time at 910. Also, this transmission can be done by way of the second transmitter that is part of the plurality of transmitters 110 of FIG. 1. The first radio beamforming waveform and the second radio beamforming waveform can be either at the same frequency or different frequencies. At 930, receiving a response to the first radio beamforming waveform can take place, and at 940, receiving a response to the second radio beamforming waveform can take place. These two receptions can be performed by receivers of the plurality of receivers 120 of FIG. 1.

Figure 10:
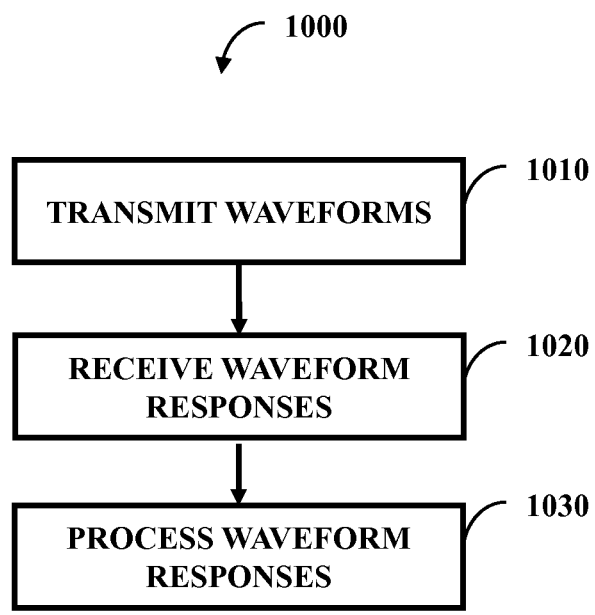
FIG. 10 illustrates one embodiment of a method comprising three actions.

FIG. 10 illustrates one embodiment of a method 1000 comprising three actions 1010-1030. At 1010, transmitting a first radio beamforming waveform can occur. This can be by way of a first transmitter that is part of the plurality of transmitters 110 of FIG. 1. Also at 1010, transmitting a second radio beamforming waveform can occur. This can be by way of a first transmitter that is part of the plurality of transmitters 110 of FIG. 1. At 1020, receiving a response to the first radio beamforming waveform, which is transmitted by way of the first transmitter, can occur. This can be done by way of a first receiver that is part of the plurality of receivers 120 of FIG. 1. Also at 1020, receiving a response to the second radio beamforming waveform, which is transmitted by way of the first transmitter, can occur. This can be done by way of a second receiver that is part of the plurality of receivers 120 of FIG. 1. At 1030, processing the response to the first radio beamforming waveform can occur by way of channelization of the first radio beamforming waveform through partitioning of the first radio beamforming waveform into a number of channels that is at least equal to a number of transmitters in the plurality of transmitters. Also at 1030, processing the response to the second radio beamforming waveform can occur by way of channelization of the second radio beamforming waveform through partitioning of the second radio beamforming waveform into a number of channels that is at least equal to a number of transmitters in the plurality of transmitters 110 of FIG. 1. This aforementioned processing can be performed by the processor 810 of FIG. 8.

While the methods disclosed herein are shown and described as a series of blocks, it is to be appreciated by one of ordinary skill in the art that the methods are not restricted by the order of the blocks, as some blocks can take place in different orders. Similarly, a block can operate concurrently with at least one other block.

What is claimed is:
1. A system, comprising:
a signal analysis component configured to analyze a first signal for transmission by a first antenna and a second signal for transmission by a second antenna, different from the first antenna, to produce a signal analysis result;

a selection component configured to select a pulse compression technique from among a time-shifted only duplex pulse compression technique, a frequency-shifted only duplex pulse compression technique, or a time-shifted and frequency shifted duplex compression technique; and a non-transitory computer-readable medium configured to store a command set executable by a processor to facilitate operation of the analysis component, the selection component, or a combination thereof, where the selection is based, at least in part, on the signal analysis result, where the first antenna is configured to transmit the first signal subjected to the selected pulse compression technique, where a second antenna is configured to transmit the second signal subjected to the selected pulse compression technique, where the first antenna is configured to transmit the first signal and the second antenna is configured to transmit the second signal, at least in part, simultaneously, where the first antenna is configured to transmit the first signal in a frequency band, and where the second antenna is configured to transmit the second signal in the frequency band.

2. A method, comprising:

transmitting, by way of a first transmitter that is part of a plurality of transmitters, a first radio beamforming waveform; and transmitting, by way of a second transmitter that is part of the plurality of transmitters, a second radio beamforming waveform;

receiving, by way of a first receiver that is part of a plurality of receivers, a response to the first radio beamforming waveform, which is transmitted by way of the first transmitter;

receiving, by way of a second receiver that is part of the plurality of receivers, a response to the second radio beamforming waveform, which is transmitted by way of the second transmitter;

processing the response to the first radio beamforming waveform by way of channelization of the first radio beamforming waveform through partitioning of the first radio beamforming waveform into a number of channels that is at least equal to a number of transmitters in the plurality of transmitters; and processing the response to the second radio beamforming waveform by way of channelization of the second radio beamforming waveform through partitioning of the second radio beamforming waveform into a number of channels that is at least equal to a number of transmitters in the plurality of transmitters.

3. The system of claim 1, comprising:

where the analysis comprises a comparison of the first signal against the second signal such that the signal analysis result comprises a result of the comparison, where when the comparison indicates that the first signal and the second signal are the same signal, the selection component selects the time-shifted only duplex pulse compression technique, and where when the comparison indicates that the first signal and the second signal are not the same signal, the selection component selects either the frequency-shifted only duplex pulse compression technique or the time-shifted and frequency shifted duplex compression technique.

4. The system of claim 3, comprising:

a frequency analysis configured to analyze an available frequency band for the first signal and the second signal to produce a frequency band analysis result, where the selection component bases the selection between either the frequency-shifted only duplex pulse compression technique or the time-shifted and frequency shifted duplex compression technique based, at least in part, on the frequency band analysis result.

5. The system of claim 1, where the first signal and the second signal are the same signal, where the first signal is a multi-pulse signal, and where when the selection component selects the time-shifted only duplex pulse compression technique, the start of transmission of the second signal occurs after an end of transmission of the first signal.

6. The system of claim 1, where the first antenna is configured to receive a response to the first signal, where the second antenna is configured to receive a response to the second signal, and where a set of antennas comprises the first antenna and the second antenna.

7. The system of claim 6, comprising:

processing the response to the first signal by way of channelization of the first signal through a partition of the signal into a number of channels equal to at least the number of antennas in the plurality of antennas and processing the response to the second signal by way of channelization of the second signal through partitioning of the second signal into a number of channels equal to at least the number of antennas in the plurality of antennas.

8. The system of claim 1, where a signal set comprises the first signal and the second signal and where the signal set is dependent, at least in part, on a number of sub-pulses.

9. The system of claim 8, where the signal set is dependent, at least in part, on a duration of an individual of sub-pulses from the number of sub-pulses.

10. The system of claim 1, where an antenna set comprises the first antenna and the second antenna where a signal set comprises the first signal and the second signal and where the signal set is dependent, at least in part, on a number of antennas in the antenna set.

11. The system of claim 1, where a signal set comprises the first signal and the second signal and where the signal set is dependent, at least in part, on a sub-carrier frequency step.

12. The system of claim 1, where a signal set comprises the first signal and the second signal and where the signal set is dependent, at least in part, on a pulse repetition interval.

13. The system of claim 1, where a signal set comprises the first signal and the second signal and where the signal set is dependent, at least in part, on a number of pulses.

14. The system of claim 1, where a signal set comprises the first signal and the second signal and where the signal set is dependent, at least in part, on a chirp rate.

15. The method of claim 2,
where a waveform set comprises the first radio beamforming waveform and the second radio beamforming waveform and
where the waveform set is dependent, at least in part, on a number of sub-pulses.

16. The method of claim 15,
where the waveform set is dependent, at least in part, on a duration of an individual of sub-pulses from the number of sub-pulses.

17. The method of claim 2,
where a waveform set comprises the first radio beamforming waveform and the second radio beamforming waveform and
where the waveform set is dependent, at least in part, on a sub-carrier frequency step.

18. The method of claim 2,
where a waveform set comprises the first radio beamforming waveform and the second radio beamforming waveform and
where the waveform set is dependent, at least in part, on a pulse repetition interval.

19. The method of claim 2,
where a waveform set comprises the first radio beamforming waveform and the second radio beamforming waveform and
where the waveform set is dependent, at least in part, on a number of pulses.

20. The method of claim 2,
where a waveform set comprises the first radio beamforming waveform and the second radio beamforming waveform and
where the waveform set is dependent, at least in part, on a chirp rate.

* * * * *